(12) United States Patent
Chu et al.

(10) Patent No.: US 10,846,480 B2
(45) Date of Patent: Nov. 24, 2020

(54) COMMON SENSE COMPREHENSION SYSTEM AND METHOD FOR COMPREHENDING CHINESE COMMON SENSE

(71) Applicant: CULTURE COM TECHNOLOGY (MACAU), LIMITED, Zhu Kuan (MO)

(72) Inventors: Bong-Foo Chu, Hang Kei Garden (MO); Hung-Lien Shen, Hang Kei Garden (MO)

(73) Assignee: CULTURE COM TECHNOLOGY (MACAU), LIMITED, Zhu Kuan (MO)

( * ) Notice: Subject to any disclaimer, the term of this patent is extended or adjusted under 35 U.S.C. 154(b) by 117 days.

(21) Appl. No.: 16/164,893

(22) Filed: Oct. 19, 2018

(65) Prior Publication Data
US 2020/0125637 A1 Apr. 23, 2020

(51) Int. Cl.
*G06F 40/30* (2020.01)
*G06N 5/02* (2006.01)

(52) U.S. Cl.
CPC ............... *G06F 40/30* (2020.01); *G06N 5/02* (2013.01)

(58) Field of Classification Search
USPC ...................................................... 704/7–10
See application file for complete search history.

(56) References Cited

U.S. PATENT DOCUMENTS

| | | | |
|---|---|---|---|
| 9,104,244 B2* | 8/2015 | Lee .......................... | G06F 3/018 |
| 2010/0309137 A1* | 12/2010 | Lee .......................... | G06F 3/018 |
| | | | 345/171 |
| 2013/0060516 A1* | 3/2013 | Chang ...................... | H04Q 9/00 |
| | | | 702/151 |
| 2018/0364905 A1* | 12/2018 | Putko ....................... | G06F 3/018 |

OTHER PUBLICATIONS

Visually and Phonologically similar characters in incorrect simplified Chinese words, Liu et al., Aug. 2010.*

* cited by examiner

*Primary Examiner* — Leonard Saint Cyr
(74) *Attorney, Agent, or Firm* — Amin, Turocy & Watson, LLP

(57) ABSTRACT

A Chinese common sense comprehension system includes a simulation module for simulating the Cangjie codes into concept information and an integration module for integrating the concept information into target information. Therefore, the Chinese common sense comprehension system adopts an innovative logical way of learning Chinese, thereby improving the accuracy of the artificial intelligence device to understand Chinese.

22 Claims, 8 Drawing Sheets

| level | position | phenomenon | cognition | category | | options |
|---|---|---|---|---|---|---|
| | concept | | | | | |
| | static/objective (body) | | | | | |
| | | abstract | | | | |
| | | | definition | source, phenomenon | | |
| | | | | symbol, syntax | | |
| | | | application | information, meaning | | 255 types, e.g., birds |
| | | | | norm, interpersonal | | |
| | | embodying | inherency | plant, animal | | |
| | | | | body, limbs | | |
| | | | man-made | daily life, work | | |
| | | | | food/cloth, residing/moving | | |
| | dynamic/subjective (use) | | | | | |
| | | knowledge | perception | mood, cognition | | |
| | | | | stimulus, feeling | | |
| | | | states | interface, knowing | | |
| | | | | transformation, change | | |
| | | behavior | capabilities | skill, intelligence | | |
| | | | | sense, stamina | | |
| | | | experiences | act, control | | |
| | | | | life, communication | | |

FIG. 3A

| category | feeling factor | meaning factor | cognition factor |
|---|---|---|---|
| car | geometric, mobile, big | man-made, vehicle | property, usage, shape |

FIG. 3B

| serial number | usage | digital code |
|---|---|---|
| 01 | situation | 0A030108 |
| 02 | time | 0C030000 |
| 03 | source | 130D0300 |
| 04 | sign | 1C050100 |
| 05 | society | 21070000 |
| 06 | affair | 231210142US |
| 07 | moral | 30000440 |
| 08 | arts | 36030140 |
| 09 | meaning | 8F040600 |
| 0A | price | BE060E00 |
| 0B | mental | C6030340 |
| 0C | body movement | C9000100 |
| 0D | mind | F00603E0 |
| 0E | dealing with affairs | F4010380 |
| 0F | transaction | F7020740 |

FIG. 3C

| | | | | | |
|---|---|---|---|---|---|
| 0 0 | 1 0 wood source | 2 0 group | 3 0 moral | 4 0 element | 5 0 grain | 6 0 food | 7 0 feeding tools |
| 0 1 sequence | 1 1 object source | 2 1 society | 3 1 message | 4 1 profile | 5 1 vegetable | 6 1 meat | 7 1 cooking tools |
| 0 2 numeral | 1 2 reason source | 2 2 organization | 3 2 event | 4 2 water front | 5 2 fruit | 6 2 side dish | 7 2 container |
| 0 3 clock | 1 3 sensing source | 2 3 affair | 3 3 identification | 4 3 water area | 5 3 branch | 6 3 food style | 7 3 filling tool |
| 0 4 orientation | 1 4 seed source | 2 4 boundary | 3 4 document | 4 4 plasmid | 5 4 viewing | 6 4 dress material | 7 4 appliance |
| 0 5 measure | 1 5 politic source | 2 5 traditional | 3 5 literature | 4 5 shape | 5 5 custom-made | 6 5 cloth | 7 5 furniture |
| 0 6 coin | 1 6 living source | 2 6 occupation | 3 6 art | 4 6 energy body | 5 6 building material | 6 6 cloth position | 7 6 decorating tool |
| 0 7 classifier | 1 7 knowing source | 2 7 position | 3 7 sign | 4 7 living body | 5 7 drug | 6 7 clothing | 7 7 toy |
| 0 8 pronoun | 1 8 scene | 2 8 relation | 3 8 goods/material | 4 8 part | 5 8 cultivating | 6 8 environment | 7 8 writing tool |
| 0 9 predicative | 1 9 energy state | 2 9 family | 3 9 spirit | 4 9 structure | 5 9 bird | 6 9 private house | 7 9 instrument |
| 0 A situation | 1 A physical state | 2 A name | 3 A belief | 4 A upper limb | 5 A animal | 6 A public use | 7 A tool |
| 0 B adverb | 1 B appearance | 2 B birthright | 3 B sensing | 4 B lower limb | 5 B aqueous | 6 B building body | 7 B farm tool |
| 0 C time | 1 C indication | 2 C behavior | 3 C property | 4 C sense organ | 5 C reptile | 6 C channel | 7 C weapon |
| 0 D auxiliary word | 1 D image | 2 D character | 3 D disease | 4 D organ | 5 D flying reptile | 6 D vehicle | 7 D machine |
| 0 E conjunction | 1 E water state | 2 E religion | 3 E destiny | 4 E body liquid | 5 E organic | 6 E component | 7 E material |
| 0 F preposition | 1 F meteorology | 2 F feudal | 3 F chance | 4 F body surface | 5 F legend | 6 F courtesy | 7 F waste |

FIG. 3D

| 8x | 9x | Ax | Bx | Cx | Dx | Ex | Fx |
|---|---|---|---|---|---|---|---|
| 8 0 light state | 9 0 mindful feeling | A 0 timing state | B 0 contiguous | C 0 food/drink | D 0 empty hand | E 0 cooking affair | F 0 will |
| 8 1 color state | 9 1 memory feeling | A 1 space state | B 1 touching area | C 1 mouth moving | D 1 touching goods | E 1 physical affair | F 1 management |
| 8 2 shape | 9 2 emotion | A 2 energy state | B 2 mutual area | C 2 facial expression | D 2 control | E 2 household | F 2 employee |
| 8 3 physical state | 9 3 funny feeling | A 3 force state | B 3 intersecting area | C 3 sounding | D 3 pinpoint | E 3 moving/staying | F 3 obedience |
| 8 4 material state | 9 4 worry feeling | A 4 containing state | B 4 correcting area | C 4 looking | D 4 shape changing | E 4 legend | F 4 behavior |
| 8 5 gender state | 9 5 sad feeling | A 5 gesture | B 5 dipping area | C 5 physical | D 5 changing body | E 5 technique | F 5 auxiliary |
| 8 6 water state | 9 6 evil feeling | A 6 knowing state | B 6 position area | C 6 psychology | D 6 changing state | E 6 agriculture | F 6 transfer |
| 8 7 gesture state | 9 7 goods feeling | A 7 ecology | B 7 measuring area | C 7 ethics | D 7 changing position | E 7 commercial | F 7 transaction |
| 8 8 eating feeling | 9 8 body property | A 8 rotation | B 8 knowing time | C 8 physical still | D 8 observe | E 8 notifying | F 8 adversary |
| 8 9 viewing feeling | 9 9 talent property | A 9 movement | B 9 knowing shape | C 9 physical move | D 9 identifying | E 9 communication | F 9 direction |
| 8 A hearing feeling | 9 A intrinsic | A A fluttering | B A knowing state | C A physical state | D A thinking | E A manner | F A getting rid of |
| 8 B skin feeling | 9 B characters | A B flowing | B B knowing profit | C B interaction | D B judgment | E B earing about | F B restriction |
| 8 C body feeling | 9 C courage | A C shape moving | B C knowing action | C C feet moving | D C understanding | E C expression | F C punishment |
| 8 D heart feeling | 9 D custom | A D attracting move | B D know meaning | C D tendency | D D intent | E D releasing | F D force |
| 8 E knowing feeling | 9 E good | A E force moving | B E knowing price | C E moving way | D E self-refraining | E E condemn | F E seize by force |
| 8 F meaning feeling | 9 F chain reaction | A F knowing | B F living | C F mover | D F description | E F fraud | F F kill |

FIG. 3D (Cont'd)

| binary | hexadecimal |
|--------|-------------|
| 0000 | 0 |
| 0001 | 1 |
| 0010 | 2 |
| 0011 | 3 |
| 0100 | 4 |
| 0101 | 5 |
| 0110 | 6 |
| 0111 | 7 |
| 1000 | 8 |
| 1001 | 9 |
| 1010 | A |
| 1011 | B |
| 1100 | C |
| 1101 | D |
| 1110 | E |
| 1111 | F |

FIG. 4A

COMMON SENSE COMPREHENSION SYSTEM AND METHOD FOR COMPREHENDING CHINESE COMMON SENSE

BACKGROUND

1. Technical Field

The present disclosure relates to artificial intelligence, and, in particular, to a Chinese common sense comprehension system for analyzing the meaning of Chinese and a method for comprehending Chinese common sense.

2. Description of Related Art

At present, electronic devices, such as computers or robots, have been equipped with a variety of artificial intelligence systems, such as dialogue, face recognition, etc., in which the language system has realized the dialogue between humans and computers.

Conventional language systems generally receive human voices or texts and then process these data and output relevant response content. Among them, for Chinese communication, the data are processed by using a built-in database or network search data.

However, the grammar of Chinese is constantly evolving and increasing, and the way in which data searches the built-in database or the network cannot be changed immediately. Therefore, conventional language systems often cannot collect relevant sentences from the built-in database or the data search on the network, and thus cannot output a correct response. The conventional practice of searching for semantic comparisons in Chinese through the Internet is not only slow and consumes a lot of hardware resources, but also cannot obtain the latest Chinese usage through web search.

Moreover, the evolution of Chinese language is about 3,000 years, which leads to too large data, and therefore it is difficult to effectively build sufficient databases.

Therefore, how to overcome the shortcomings of the prior art to obtain a new Chinese common sense comprehension system is actually a technical problem that various fields are currently trying to solve.

SUMMARY

In view of the above-mentioned various deficiencies of the prior art, the present disclosure discloses a Chinese common sense comprehension system, which comprises: a simulation module for simulating Cangjie codes into concept information, wherein the concept information includes at least one digital code; and an integration module for integrating the concept information into target information, wherein the target information includes at least one program code.

The present disclosure also discloses a method for comprehending Chinese common sense, which comprises: simulating Cangjie codes to concept information via a simulation module, wherein the concept information comprises at least one digital code; and integrating the concept information into target information via an integration module, wherein the target information includes at least one code.

In an embodiment, the digital code contains at least one character. In another embodiment, the character is presented in a hexadecimal manner.

In an embodiment, the simulation module uses the concept classification method to simulate Cangjie codes into the digital code.

In an embodiment, the simulation module uses the natural meaning method to simulate Cangjie codes into the digital code.

In an embodiment, the integration module has a conversion unit for calculating the digital code into the program code as temporary information. In another embodiment, the digital code is converted into the program code by a carry conversion method, wherein the carry conversion method performs a conversion between any two of the binary system, the octal system, the decimal system, and the hexadecimal system. In yet another embodiment, the integration module has an analysis unit for analyzing the temporary information and determining the correctness of the codes, so that the program code which is determined is used as the target information, wherein the analysis unit analyzes the temporary information by defining information to determine the correctness of the codes.

In an embodiment, an identification module is further included that is configured to interpret input information into the Cangjie codes, wherein the input information includes at least one Chinese character. In another embodiment, the target information corresponds to the input information.

In an embodiment, a reference module is further included that includes at least one reference information, and the integration module compares the reference information with the digital code, and, after comparison, obtains the program code which is required to be used as the target information.

The present disclosure further provides an artificial intelligence device, comprising: an aforementioned Chinese common sense comprehension system; and a response system, which outputs information according to the target information.

In an embodiment, the artificial intelligence device is a fixed device or a mobile device.

It can be seen from the above that in the Chinese common sense comprehension system and the method for comprehending Chinese common sense according to the present disclosure, the input Chinese character string is mainly disassembled into Cangjie codes by the stimulation module, and then the Cangjie codes are simulated into the digital code. Afterwards, the digital code is converted into codes by the integration module, so that the integration module analyzes and selects correct codes as the target information, and the target information may correspond to the meaning of the input of the Chinese character string. Therefore, as compared with the conventional technology of building a large number of databases, the Chinese common sense comprehension system according to the present disclosure uses the method of disassembling Chinese into Cangjie codes to obtain an analysis algorithm for obtaining Chinese comprehension logic, thereby improving the accuracy of Chinese comprehension of the artificial intelligence device and reducing the number of built-in databases.

BRIEF DESCRIPTION OF THE DRAWINGS

FIG. 3A illustrates a hierarchical diagram of the concept classification method of the simulation module of the Chinese common sense comprehension system according to the present disclosure.

FIG. 3B illustrates a schematic diagram of one of the Chinese character genes of the simulation module of the Chinese common sense comprehension system according to the present disclosure.

FIG. 3C illustrates a schematic diagram of digital codes of one of the Chinese characters of the simulation module of the Chinese common sense comprehension system according to the present disclosure.

FIG. 3D illustrates the option classification chart of FIG. 3A.

FIG. 4A illustrates a schematic diagram of the carry-over conversion mode of the conversion unit of the integration module of the Chinese common sense comprehension system according to the present disclosure.

DETAILED DESCRIPTION

The embodiments of the present disclosure are described below by way of specific embodiments, and persons skilled in the art can readily appreciate the other advantages and effects of the present disclosure.

It is to be understood that the structure, the proportions, the size and the like according to the present disclosure are only used in conjunction with the disclosure of the specification for the understanding and reading for persons skilled in the art, and are not intended to be used as limited conditions of the disclosure, and hence it is not technically meaningful. The modification of any structure, the change of the proportional relationship or the adjustment of the size shall still fall within the scope of the technical content disclosed in this disclosure under the circumstance that the effects which the present disclosure can bring about and the objectives which the present disclosure can arrive at are not affected. In the meantime, the terms used in this specification, such as "a", are used for convenience of description, and are not intended to limit the scope of the disclosure, and the change or adjustment of the relative relationship should be viewed as within the scope of enablement in the case that no substantive change of the technical content is made.

Figure 1:
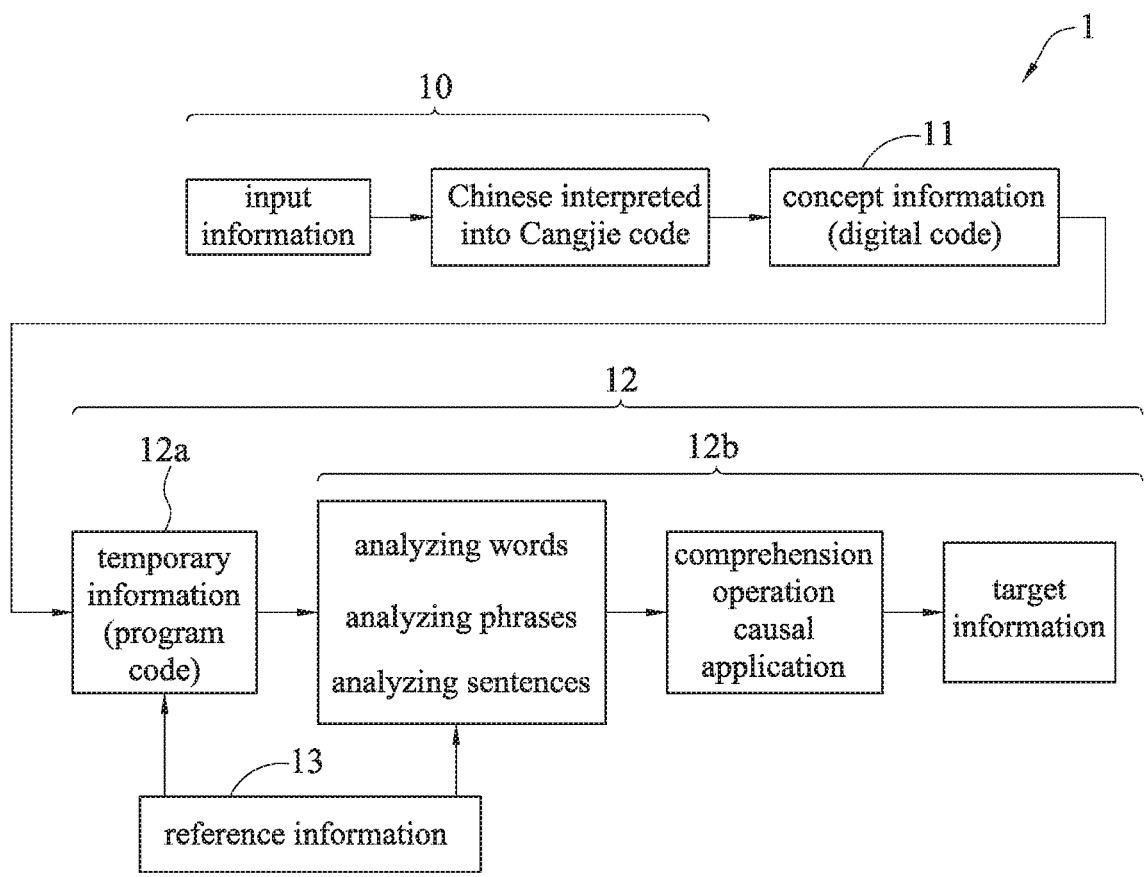
FIG. 1 illustrates a schematic diagram of the configuration of a Chinese common sense understanding system according to the present disclosure.

Please refer to FIG. 1, which is a schematic diagram of the configuration of a Chinese common sense comprehension system 1 according to the present disclosure. In an embodiment, the Chinese character system was used 3000 years ago, and no new Chinese characters appeared in the past 100 years. Therefore, the Chinese common sense comprehension system 1 according to the present disclosure is based on existing Chinese characters.

As shown in FIG. 1, the Chinese common sense comprehension system 1 is a computer system, which comprises an identification module 10, a simulation module 11, an integration module 12, and a reference module 13.

The identification module 10 is configured to interpret the input information into Cangjie codes, so that the computer system can read the Chinese characters. In an embodiment, the input information includes at least one Chinese character, such as a single Chinese character or a sentence contacting a plurality of Chinese characters (for example, a group of string).

In an embodiment, the Cangjie code is a program code of a known Chinese input method (published in 1976), and the principle is to decompose Chinese characters according to basic elements, and each of the basic elements corresponds to 26 English letters, as shown in the following table:

| Classification | Basic element |
|---|---|
| Philosophy | 日(A), 月(B), 金(C), 木(D), 水(E), 火(F), 土(G) |
| Stroke | 竹(H), 戈(I), 十(J), 大(K), 中(L), 一(M), 弓(N) |
| Human body | 人(O), 心(P), 手(Q), 口(R) |
| Glyph | 尸(S), 廿(T), 山(U), 女(V), 田(W), 卜(Y) |

Figure 2:
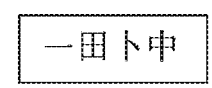
FIG. 2 illustrates a schematic diagram of the Cangjie codes of the Chinese common sense comprehension system according to the present disclosure.

Therefore, generally on the computer screen, when the user uses the Cangjie input method, the basic elements of the Chinese character "面" (face) are " 一冂卜中 " as shown in FIG. 2, and the input for the Cangjie code received by the computer is MWYL.

Moreover, the technology of the Cangjie code also keeps improving the modes after decomposition with respect to the speed of the computer in determining Chinese characters (for example, simplified or traditional). For example, the third generation Cangjie code for the Chinese character "面" is MWYL (basic element: "一山卜中"), and the fifth generation Cangjie code for the Chinese character "面" is MWSL (basic element: basic element: "一田尸中"). The code of the Cangjie indexing system for Chinese characters of the Chinese character "面" is MWS (basic element: "一卌卜").

Moreover, the Cangjie code encodes the code as a Unicode code, and then converts it into a read code to correspond to the subsequent digital code. In an embodiment, the Unicode code of " 一 " (one) is 4E00, and the read code is B4808080.

Therefore, the technology related to the Cangjie code is well known in the industry, so the related art of the Cangjie code will not be described here.

The simulation module 11 is configured to simulate the Cangjie code into concept information, and the concept information includes at least one digital code. That is, the simulation module 11 searches for all the corresponding digital codes after receiving the Cangjie code (MWYL) and integrates the corresponding digital codes into concept information.

In an embodiment, the simulation module 11 uses the concept classification method to simulate the Cangjie code into a digital code. The concept classification method is a method of classifying Chinese characters and Chinese words according to different attributes. In an embodiment, the Chinese character system defines 1024 genes (one type of the Chinese character genes is shown in the following table), and the concept classification method divides the 1024 Chinese character genes into five levels (position, phenomenon, cognition, category and item) to define 255 concept options (as shown in FIGS. 3A and 3D, the contents of the Chinese characters included in each option are detailed in the attachment), and then encodes 255 concept options with the hexadecimal system (00-FF) (00 is not compiled any concept option), so that the digital code contains at least one character, and the character is presented in a hexadecimal system (00-FF).

| Common radical types | Chinese character genes |
|---|---|
| Plant | 米,禾,黍,麦,竹,艸 |
| Natural object | 日,月,金,木,水,火,土,风,阜,玉,雨,石,气,山 |
| Animal | 贝,牛,鸟,犬,鹿,虫,豕,鱼,龟,人,隹,马,羊,鼠 |
| Behavior | 走,彳,斗,食,入,言 |
| Body | 骨,目,弗,舌,爪,毛,身,页,角,肉,心,手,口,足,尸,彡,月,羽,革 |
| Surroundings | 囗,穴,厂,邑,田 |
| Color | 赤,白,黑 |
| Artificial object | 门,皿,鼓,舟,斤,殳,臼,车,巾,酉,瓦,弓,矢,缶,耒,刀,糸,衣 |
| Cognition | 鬼,力,片,示,歹,子,女,止,方 |

In an embodiment, as shown in FIG. 3B, the Chinese character "車" (car) can be categorized into three Chinese character genes, and these Chinese character genes are defined as a concept option representing "vehicle," and the digital code is defined as "6D."

Furthermore, the factor code "6D" stands for "vehicle," which includes a variety of vehicles, such as ships and boats, so it is easy to cause too much wider range of system comprehension. Therefore, in order to make the system more accurately comprehend each Chinese character, the digital code is defined with multiple characters, and each character represents a meaning. In an embodiment, the digital code "59" represents a broad definition of birds. The digital codes "59 10" of these two characters stand for the definition of "non-flying poultry." The four-character digital codes "59 00 00 00" stands for the precise definition of "bird." In an embodiment, in the four-character digital codes "59 00 00 00", the digital code "59" of the first character represents a large classification (which classifies the above 255 concept options, for example, the noun class is 00-7F, the adjective class is 80-A7 and the verb class is A8-FF), the digital code "00" of the second character represents the subcategory (that is, an item in the part of speech class), the digital code "00" of the third character and the digital code "00" of the fourth character represent the preparatory characters (that is, the code that is extended according to the requirements of the definition of the Chinese character). It should be understood that the number of characters included in the digital code can be designed according to the requirements of comprehension accuracy, and is not particularly limited.

Therefore, the same Chinese character may have multiple different digital codes for its use. For example, "行" can define 15 digital codes, as shown in FIG. 3C, so the concept information of the Chinese character "行" will contain 15 digital codes.

In another embodiment, the simulation module 11 can also simulate the Cangjie code into digital codes by using a natural meaning method. In an embodiment, the natural meaning method is to classify the meaning of the main components of a Chinese character. In an embodiment, "炎" is regarded as "fire" and "硬" is regarded as "stone." The encoding is performed in conjunction with the hexadecimal system, and the digital code can include at least one character.

Moreover, the digital code can adopt a variety of classification methods. In an embodiment, it can be classified according to the six categories of Chinese characters (pictogram, ideograms, composite ideographs, phono-semantic compounds, transferred characters and borrowed characters,) or description of the solution, and is not particularly limited thereto.

In addition, the digital code can adopt a variety of coding methods, such as a binary system, an octal system, or a decimal system, which is not limited to the above-mentioned hexadecimal system.

The integration module 12 is configured to integrate the concept information into target information so that the target information conforms to the input information.

In an embodiment, the integration module 12 has a conversion unit 12a and an analysis unit 12b.

The conversion unit 12a is configured to calculate the digital code into a program code as temporary information. In an embodiment, the conversion unit 12a converts the digital code into codes by using a carry conversion method. In another embodiment, the carry conversion method converts the hexadecimal code into a binary code, and, as shown in FIG. 4A, each character of the digital code is converted into a binary code. Taking the digital code "59 00 00 00" as an example, the digital code "59" of the first character is converted into the first program code "0101 1001," and the digital code "00" of the second program character is converted into "0000 0000." The digital code "00" of the third program character is converted into the third program code "0000 0000," and the digital code "00" of the fourth program character is converted into the fourth program code of "0000 0000."

Figure 4B:
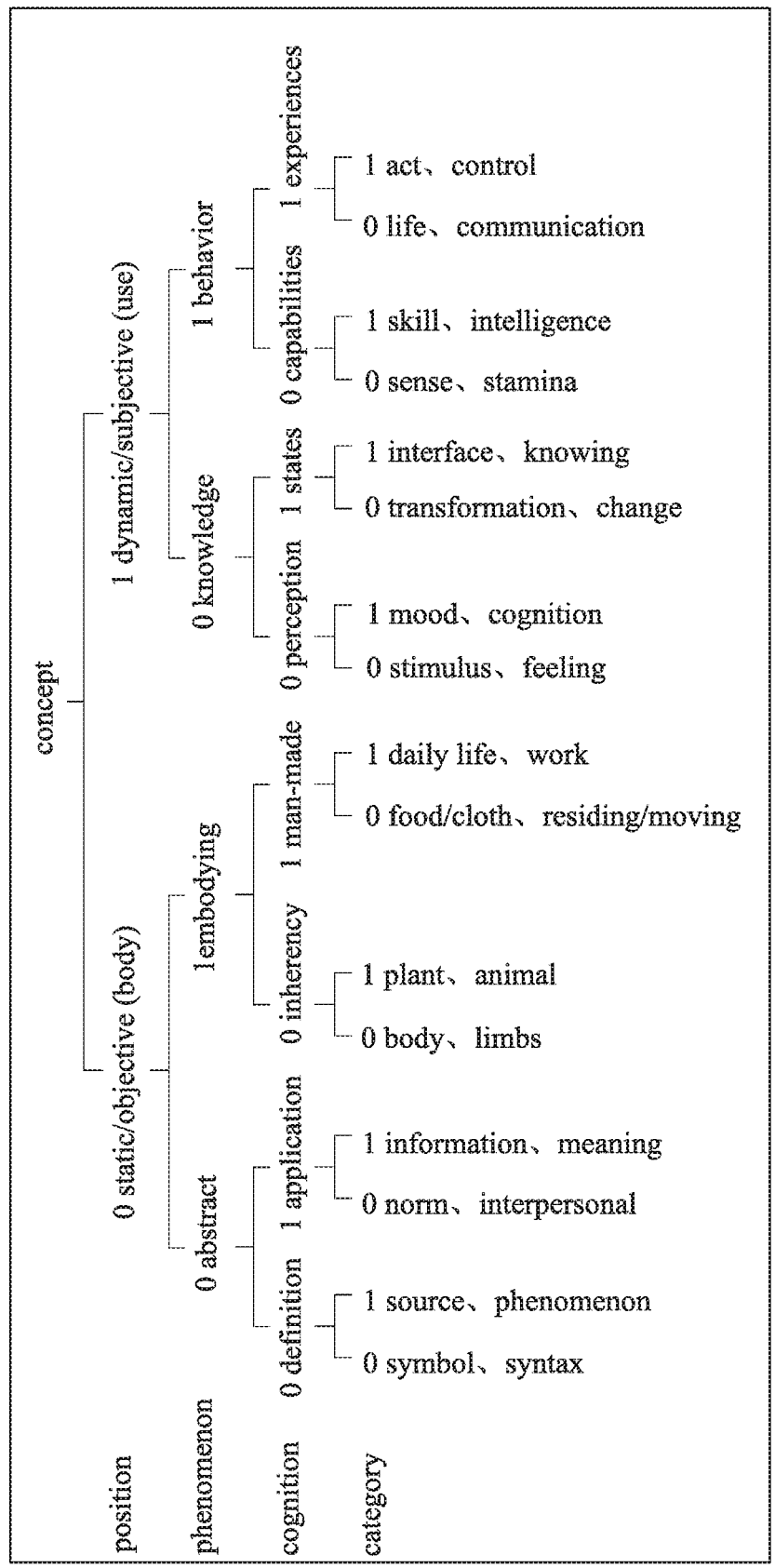
FIG. 4B illustrates a schematic diagram of the built-in definition information of the analysis unit of the integration module of the Chinese common sense comprehension system according to the present disclosure.

The analysis unit 12b is configured to determine the correctness of the temporary information according to the temporary information, to perform a comprehension operation (causal application), and further acquire the target information. In an embodiment, the analysis unit 12b analyzes the definition information built in the system (as shown in FIG. 4B) to analyze the meaning of the codes, and then determines whether the target information can be used. In an embodiment, if the input information belongs to a sentence pattern, the codes of the correct term attribute are selected as the target information according to the relevance of the context of the words.

Furthermore, for analyzing a single Chinese character, for example, the temporary information composed of the first to fourth program codes generated by the above-mentioned digital codes "59 00 00 00" can obtain the first program code "0101 1001" as in the bird subclass of the class of plant or an animal, based on the definition information shown in FIG. 4B. Furthermore, according to the other definition information (not shown) or the reference information of the reference module 13 described later, the second program code "0000 0000" falls within the class of animals which can fly and walk, and the third and fourth program codes are meaningless. Therefore, the analysis unit 12b determines the single Chinese character as "鳥" (bird) based on the meaning of the first to fourth program codes. As such, "鳥" is used as target information.

Regarding analysis of words, for example, the temporary information consisting of the multiple groups of codes of "小" (small) and the codes of "鳥" (bird), according to the definition information and other definition information shown in FIG. 4B (or the reference information of reference module 13 described later), the analysis unit 12b can arrange various combinations and compare the possibilities thereof to discriminate that "鳥" is a noun and "小" is an adjective, so that the correct meanings of the code of "小" and the code of "鳥" are obtained, such that "小鳥" (little bird) is used as target information. It should be noted that in other definitions, the custom terms can be integrated to create an acronym and abbreviation term list. For example, "跑男" (Running man) means "Run, brothers" and "仙劍" means "仙劍奇俠傳" (Legend of Sword and Fairy).

Regarding analysis of sentence patterns, for example, the temporary information consisting of the code of "鳥", the code of the "會" (can) and the code of "飛" (fly), according to the definition information and other definitions shown in FIG. 4B (or the reference information of the reference module 13 described later), the analysis unit 12b can arrange various combinations and compare the possibilities thereof to discriminate that the "鳥" is a noun, the "會" (can) is a supporting word, and "飛" is a verb, so that the correct meanings of the code of "鳥", the code of "會" and the code of "飛" are obtained, such that "鳥會飛" (bird will fly) is used as target information. In an embodiment, the digital code of "鳥" is "59 00 00 00," the digital code of "會" is "0A 00 00 01," and the digital code of "飛" is "AA 02 00 20," wherein "AA" stands for fluttering, and "AA 02" stands for the action of the feathers and wings, which contains Chinese characters with genes of flying or "feather" (such as "翱", "翔", "翩", etc.).

It should be noted that in Chinese sentence patterns, there will be ambiguity between combination, with preceding or succeeding words. For example, in the sentence "我經濟南下車到廣州，買水果然後來世博園，" two sets of concepts may be brought about, namely the first set (I, Jingji, went southbound to Guangzhou to buy "fruit" and then "afterlife" Bo Garden) and the second set (I got off at Guangzhou via Jinan to buy water, "surely" and "later" "Expo Park"). The analysis unit 12b will analyzes them by the analysis of rationality of sentence patterns, so the first and the second sets are arranged and cross-matched to obtain a reasonable sentence pattern (I got off the bus to Guangzhou via "Jinan" and bought "fruit" "Then" will come to the "Expo Park").

Further, for the processing of the polysemous words, as shown in FIG. 3C, the word "行" contains 15 digital codes, and the analysis unit 12b can adopt the following first to fourth processing methods.

In the first method, if the word (as shown in FIG. 4B) has been defined in the definition information as a generic word, such as "銀行" (bank), "行李" (baggage), etc., according to the preceding or succeeding words, the digital code directly using the universal word is converted into codes, for example, the proper nouns in each field such as the digital code "17 2A nn nn" of the product, the digital code "17 03 nn nn" of the manufacturer, the digital code "17 69 nn nn" of the brand, the digital code "17 64 nn nn" of the branch, the digital code "17 15 nn nn" of video, the digital code "17 16 nn nn" of film, and the digital code "17 0F nn nn" of application software.

In the second method, if the first character is the same among the plurality of digital codes received by the conversion unit 12a, the analysis unit 12b is preferentially used. In an embodiment, the first character of the digital code of "行" (walk) is "C9," and the first character of the digital code of "走" (go) is "C9," so the analysis unit 12b will preferentially select the codes of "行走" as the target information. In an embodiment, the concept information of "機" has four digital codes (the concept option "12 06 00 00" for the source of rationality, the concept option "7D 00 00 02" for the machine, the concept option "99 04 07 40" for the talent, and the concept option "BD 09 02 00" for the knowing), the concept information of "警" has two digital codes (the concept option "99 04 08 00" for the knowing and the concept option "F1 0D 00 00" for the management), and 機警: the first character of the digital codes of "機" and "警" has the intersect of "99." Therefore, the analysis unit 12b takes the concept option (representing "knowing") of "99" as the target information, that is, the codes of "機警."

In the third method, the grammar can be clearly distinguished from the preceding and succeeding words, and the analysis unit 12b selects the priority as the target information. In an embodiment, " 一行 " (one line) is a quantifier, "真行" (skillfully) is an adverb, and "行嗎" (are you capable of?) is an interrogative word.

In the fourth method, the conversion unit 12a directly specifies one of the digital codes of the "行" word of the concept information according to the reference information of the reference module 13 (as described in detail later), and converts the specified digital code into the codes, such that the analysis unit 12b uses the codes as the target information. For example, the "行" of "義行" directly specifies the digital code "13 0D 03 00" of No. 03 in FIG. 3C.

The reference module 13 has built-in reference information for the integration module 12 to compare the digital code received by the integration module 12 and integrate the temporary information into the target information after comparing the digital codes of the concept information with the reference information.

Figure 5:
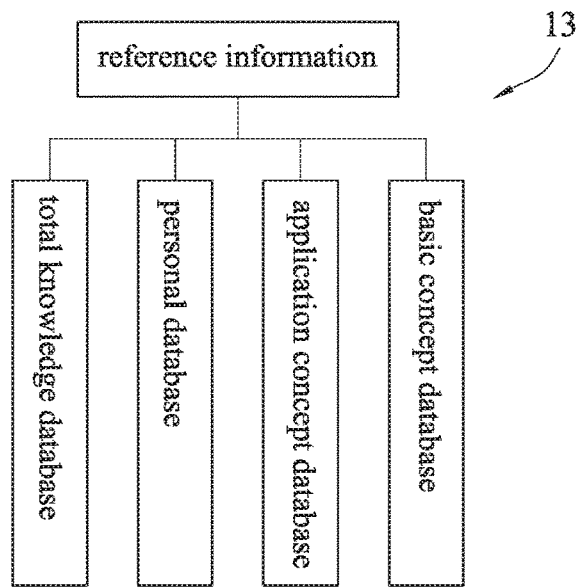
FIG. 5 illustrates a schematic diagram of reference information of the reference module of the Chinese common sense comprehension system according to the present disclosure.

As shown in FIG. 5, the reference module 13 comprises plural reference information, for example, a basic concept database, a personal database, a total knowledge database, and an application concept database, and the like. In these databases, at least one field is defined for the specified digital code.

The basic concept database is used to store basic everyday language (such as phrases, idioms) and person names (such as famous people). In the case of idioms, the digital codes of the idiom "日暖風和" can be defined as the digital code "1F 09 00 00" of the Chinese character "晴" and stored in the field of the Chinese character "晴" in the database. Therefore, when the integration module 12 receives the digital codes of the four Chinese characters "日", "暖", "風" and "和," codes calculated in view of the digital codes of a Chinese character "晴" are directly adopted as temporary information, according to the basic concept database (if there is no discriminant consideration of other contexts, the analysis unit 12b can directly use the temporary information as the target information).

The personal data library is used to store related information of the user, such as personal memorandum, personal relationships, personal objects, personal impressions, personal body and mind, personal daily routine, personal logs, and the like.

The total knowledge database comprises riddles, holidays, place names, characters, poems (Tang and Song poetry), historical bureaucratic establishments, etc., which can be built in the reference module 13, or searched automatically by the Chinese common sense comprehension system 1 over the internet and then stored in the reference module 13.

The application concept database comprises commonly used sentence patterns, behaviors in scenes, structural parts (fields of the database) or essence-practice causality.

In an embodiment, the common sentence type data is from a language in which a virtual character usually talks with a user, and stores the memory thereof. For example, the mantra, the above-mentioned acronyms or abbreviations (such as "跑男", "仙劍").

In an embodiment, the scene behavior data is related to an associated set mainly consisting of scenery such as a character, a thing, a time, a place, an object, and the like, to describe interactive acts, which opens for a purpose, of each character (or as a role) in a scene (such as a restaurant, a hotel, a conference room, etc.). Examples are fields such as buildings (such as times, styles, functions, compartments), characters (or as roles), behaviors, etc. Examples are that the location is a Chinese restaurant, the time is Song Dynasty (with animation), the function is to eat, the compartment includes the passenger area, the shopkeeper area, the eating area, the kitchen, and the like. The characters (or as the roles) include the shopkeepers, waiters, diners and buskers. Behavior is an action that a character does in a restaurant.

In an embodiment, the structural part data is used as an understanding of the metaphor. In an embodiment, in the structural part data of the application concept database, the field 0123 of "鳥" (bird) is defined as a flight field, and the data content is a wing, the 0123 field of "人" (person) is defined as a flight field, and the data content thereof is imagination/aircraft. Therefore, the comparison of the same field (field 0123) of the structural part information by the analysis unit 12b will be understood as "鳥的翅膀就是人的想像力" (the bird's wings are the imagination of the human being) or "此中美景任我翱翔" (I am soaring freely in the beauty of the scenery).

In an embodiment, the essence-practice causality data sets causal attributes of the digital codes. In an embodiment, the digital code of "火" is "19 05," which is in the 0302 field of the application concept database. The relevant features can be recorded, according to attributes, as the essence-practice causality data, such as combinations of 12 sets, 24 types of concept information of digital code "80 00" for "亮", "80 04" for "熾", "81 02" for "紅", "8B 00" for "燙", "8B 01" for "熱", "8B 02" for "暖", "A1 02" for "大", "A1 03" for "小", "A3 01" for "盛", "A3 02" for "強", "A3 03" for "猛" and "A3 04" for "弱", so that the characteristics of "火" (brightness, heat, color, Intensity, situation, etc.) can be described. Hence, when the input is "火 是熱的嗎" (is fire hot?), it can refer to the digital code "8B 01" of "熱" in the 0302 field of the application concept database for analysis and judgment by the analysis unit 12b.

Figure 6:
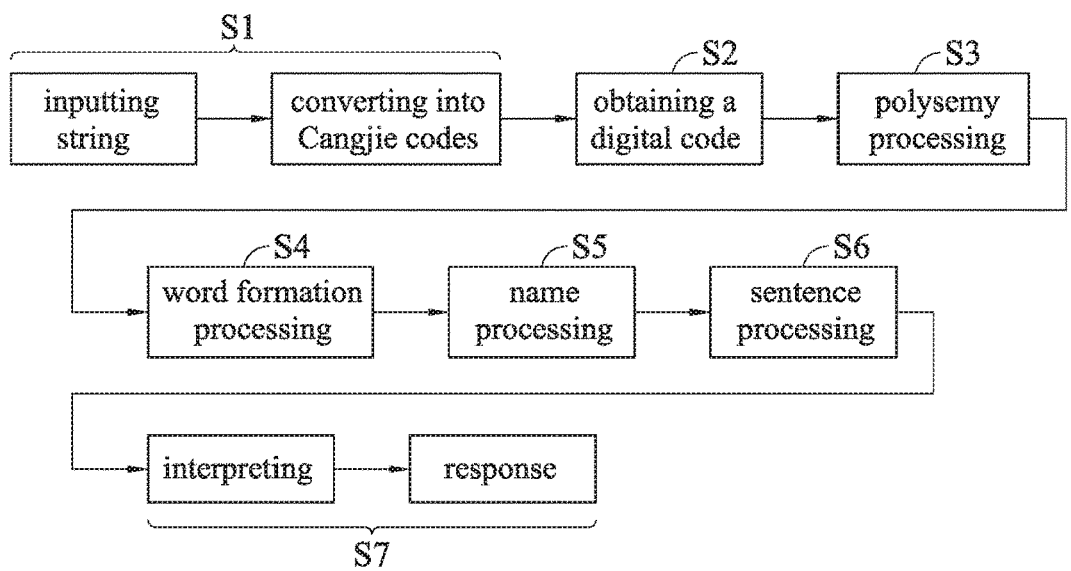
FIG. 6 illustrates a flow chart of a method for comprehending Chinese common sense according to the present disclosure.

Based on the above-mentioned Chinese common sense comprehension system design, the following will exemplify the embodiment of the Chinese common sense comprehension system according to the present disclosure in actual operation, such as the flow chart shown in FIG. 6.

First Embodiment

Step S1: Enter the string "週六上午, 我邀張三在紅衛廣場見面。" (Saturday morning, I invite Zhang San to meet at the Red Square.)

It should be noted that the string, whether it is voice or text, is input in the Unicode code of Cangjie, and then the Unicode (Little endian) is converted into the read code of Cangjie, wherein the "input" contains AH indicating the first program code of UNICODE, AL indicates the second character of the Unicode code and DS_ESI indicates the coding address +2, and CY of the "output" indicates that it cannot be found and NC indicates EAX (representing the Cangjie code). In an embodiment, the Unicode code of " · " is 4E00, the read code of Cangjie is B4808080 (five characters are compressed to four characters), AH=4E, AL=00 when input, and EAX=808080B4 when output. In addition, in the Wintel environment, Little endian is more commonly used.

Therefore, the Unicode codes of this string are as follows:

| 週 | 六 | 上 | 午 | , |
|---|---|---|---|---|
| 3190 | 6D51 | 0A4E | 4853 | 0CFF |
| 我 | 邀 | 張 | 三 | 在 |
| 1162 | 8090 | 355F | 094E | 2857 |
| 紅 | 衛 | 廣 | 場 | 見 |
| 057D | 5B88 | E35E | 3458 | 8B89 |
| 面 | 。 | | | |
| 6297 | 0230 | | | |

The Cangjie codes converted from the read codes of this string are as follows:

| 週 | 六 | 上 | 午 | , |
|---|---|---|---|---|
| E4A3E480 | E4B08080 | E5D08080 | BDADC080 | 8080A0AC |
| 我 | 邀 | 張 | 三 | 在 |
| A294C080 | E589D680 | BAB6EC80 | B5D6C080 | ADC3C080 |
| 紅 | 衛 | 廣 | 場 | 見 |
| D8E6C080 | A1F2A2F0 | A6C68680 | 9C96D080 | 8AD4AA80 |
| 面 | 。 | | | |
| B6F9C080 | 8080A0AE | | | |

Step S2: The read codes of Cangjie are converted into digital codes. It should be noted that "input" includes DS_ESI as the starting point of the data, ECX indicates the data length and ES_EDED as the output address, and "output" includes EBX indicating the length of the current processing and ES ED indicating the output address.

Therefore, this string is converted into digital codes as shown in the following table:

| 週 | 六 | 上午 (according to reference information) | | , |
|---|---|---|---|---|
| 03050A00 | 02011006 | 03080203 | 00000000 | 130F0180 |
| 我 | 邀 | 張 | 三 | 在 |
| 08000000 | EB0200A0 | 07401D20 | 02011003 | 0C040100 |
| 紅 | 衛 | 廣場 (according to reference information) | | 見 |

| | | | |
|---|---|---|---|
| 3C070000 面 | F50101A0 。 | 6A0A7220 00000000 | C4000680 |
| 48030703 | 130F0101 | | |

Step S3: Polysemy processing. Because the history of the language is long and the use thereof is flexible, a word is often derived from a certain attribute, and hence the case of polysemy.

Therefore, "週" includes the meaning of "星期" (week) or "週期" (cycle). If it is followed by a number (i.e., digital code 02 01), such as "六" (six), then "週" is set to the time meaning, that is, "星期" (week).

Step S4: Word formation processing. The "紅衛" of "紅衛廣場" (Hongwei Plaza) is a centering attributive phrase with an adjective. The preceding word is the preposition "在", which is used to connect time, place, or architecture, etc., and the succeeding word "廣場" (plaza) (the concept code "6A") indicates the location. Therefore, "紅衛" and "廣場" can be combined into one phrase. "紅衛" is regarded as a proper noun.

Step S5: Name processing. The second character of the digital codes of "張" of "張三" (07 40 1D 20) is "40", which means it may be "姓氏" (name). Therefore, whether it is a name is checked according to the reference information of the reference module 13.

Specifically, the preceding word "邀" (invitation) of "張" is a transitive verb, and the object thereof is a person (the concept of digital code EB is human behaviors), and the succeeding word "在" after "三" is a preposition, and thereby "張三" can be regarded as a name, in which the Chinese name can be a number. If no parameters are parsed later, or if the parameters do not match, the words will be re-analyzed.

Step S6: sentence processing. As shown in the following table:

| Original term | Analysis | Part of speech and sentence components |
|---|---|---|
| 週六上午 | Digital codes 03?? | Time word |
| , | Digital codes 130F | Punctuation |
| 我 | Digital codes 08?? | Pronoun (subject) |
| 邀 | Digital codes > A7, Fourth character = 80, transitive verb | Verb |
| 張三 | Name processing | Noun (person name, object) |
| 在 | Digital codes 0F02, time or place | Preposition |
| 紅衛廣場 | Name and digital codes 6A?? | Noun (place, mediator) |
| 見面 | Digital codes C4?? | Verb phrase |
| 。 | 130F0101 | Punctuation, indicating end of the sentence |

Among them, the first two characters of the digital code of "邀" are EB 02, and the 0402 field of the "conceptual sub-class" of the database is read as "E9200000," wherein the first character represents the relevant information required by the present verb, as shown in the following table:

| 80 | 40 | 20 | 10 | 08 | 04 | 02 | 01 |
|---|---|---|---|---|---|---|---|
| Time | Location | Person | Event | Object as human being | Outcome | Cause | Object as non-human |

The second verb represents the object category of the present verb, which is shown as follows:

| 80 | 40 | 20 | 10 | 08 | 04 | 02 | 01 |
|---|---|---|---|---|---|---|---|
| All | Human being | Human affairs | Character | | | | |

Therefore, if it is C8, then "邀" should have corresponding information such as time, place, person, object (person). If it is 20, then the object of "邀" should be person and event (person=張三, event=見面 (meeting)).

Step S7: Comprehension and response. The so-called "comprehension" can be defined as "the data input from the five senses can be linked to the corresponding database in the brain (if it cannot be connected, doubts will arise)." The comprehension of a computer is also the same. In the process of comprehension, the input string (currently only two sources of voice and keyboard input) is analyzed to generate various parameters, and then each database is connected. If the connection does not hinder, it is indicated that the comprehension is correct. Then a response is provided according to the parameters. If there is a problem with the connection or the parameter is insufficient, the Chinese common sense comprehension system 1 will ask a question and wait for clarification. For example, if the input is "is the sun round", it will respond: Do you want to ask "Is the sun round."

Therefore, the comprehension is as follows:

"週六上午" (Saturday morning): FLAG ON for the absolute time of the week (Saturday) and the time of the day (morning). (If there is the word "tomorrow", the relative time is ON), which serves as agreed time or speaking time of the action "邀" (invitation) (if the latter, there will be another time word).

",": comma, representing that the present sentence is not yet finished.

"我" (I): It is the subject of the sentence, and the attribute is "person"; the actor FLAG ON.

"邀" (invite):

a. It is a verb in the sentence, and EB is set as a human behavior, taken from 0402 field of "Concept sub-class" of the database.

b. Checking that there are known time and actor (i.e., 1, 2).

c. The object of "邀" is "張三" (see Step S6), so there is a target person.

d. The succeeding word "在" is a location preposition, which introduces the location of the "紅衛廣場" (Hongwei Plaza).

e. The succeeding verb of "邀" is "見面" (meeting) and complies with the conditions of the second character 20 (person+event).

"張三": It is the object of the sentence and is the target object of the verb "邀".

"在": It is a preposition, which tells the place.

"紅衛廣場" (Hongwei Plaza): It is the prepositional object of the sentence, indicating the place where "見面" (meet) happens.

"見面" (meet): It is the second verb phrase for this sentence, indicating the purpose of "邀" (invite) (meeting, eating, watching movies, playing . . . , etc.).

".": indicates the end of this statement.

Second Embodiment

Step S1: Enter the string "告訴我澳門明後天的氣溫如何。" (Tell me how bad the temperature is in Macau tomorrow).

Therefore, the Unicode codes of the Cangjie codes of this string are as follows:

| 告 | 訴 | 我 | 澳 | 門 |
|---|---|---|---|---|
| 4A54 | 348A | 1162 | B36F | 8095 |
| 明 | 後 | 天 | 的 | 氣 |
| 0E66 | 8C5F | 2959 | 8476 | 236C |
| 溫 | 如 | 何 | 。 | |
| AB6E | 8259 | 554F | 0230 | |

The read codes of this string converted into Cangjie codes are as follows:

| 告 | 訴 | 我 | 澳 | 門 |
|---|---|---|---|---|
| A0F98080 | E6A49BC8 | A294C080 | 95819680 | 85E08080 |
| 明 | 後 | 天 | 的 | 氣 |
| 84A08080 | A1FB92A8 | B5B08080 | A0808080 | BDE38880 |
| 溫 | 如 | 何 | 。 | |
| 96F7E880 | DAA08080 | BDD7A480 | 8080A0AE | |

Step S2: The read codes of Cangjie codes are converted into digital codes, and the string is converted into digital codes as follows:

| 告 | 訴 | 我 | 澳門 (according to the reference information) |
|---|---|---|---|
| E8020080 | E8020180 | 08000000 | 16130401 00000000 |
| 明 | 後 | 天 | 的 | 氣溫 (according to the reference information) |
| 030004D1 | 030005D2 | 03050B01 | 0D000000 | 10120100 |
| 如何 (according to the reference information) | 。 | | | |
| 0B170600 00000000 | 130F0101 | | | |

Step S3: Polysemy processing. Because the history of the language is long and the use thereof is flexible, a word is often derived from a certain attribute, and hence the case of polysemy.

In an embodiment, the Chinese character "後" contains three meanings, such as "the day after tomorrow" (time), "behind" (orientation) and "post-to" (order). The digital code of the Chinese character "明" before "後" has the concept of digital code "03," and the Chinese character "天" after "後" also has the concept of the digital code "03," so the Chinese character "後" is taken the time concept of "03."

The Chinese character "明" contains five meanings: tomorrow, Ming Dynasty, bright, wise, and clear.

Step S4: Word formation processing. These three consecutive Chinese characters "明" "後" and "天" all comprise the feature that the first character of the digital codes is of the concept of "03," as indicated in Step S3, and therefore "明後天" can constitute a phrase.

Step S5: Name processing, confirming that there is no name.

Step S6: sentence processing. As shown in the following table:

| Original term | Analysis | Part of speech and sentence components |
|---|---|---|
| 告訴 | Concept code >A7H, Fourth character = 80H, transtive verb | Verb |
| 我 | Digital codes 08?? | Pronoun (object) |
| 澳門 | Digital codes 16?? | Noun (Note five, place, centering attributive phrase) |
| 明後天 | Digital codes 03?? | Time word (centering attributive phrase) |
| 的 | Digital codes 0D00 | Auxiliary |
| 氣溫 | Digital codes 1012 | Noun (subject) |
| 如何 | Digital codes 0B17 | Adverb |
| 。 | Digital codes 130F | Punctuation, indicating end of the sentence |

Among them, there is no subject before "告訴" (tell), and the subject that is omitted in view of the object is "你" (you) or "我" (me). As for the indirect object+direct object after "告訴" the latter is the subject-predicate phrase. "澳門" (Macau) is a centering attributive phrase that modifies "temperature". "明後天" is also a centering attributive phrase that modifies "temperature". Although "如何" is an adverb, in Chinese sentences, verbs can sometimes be omitted. For example, the verb "高低" in this sentence is omitted.

Step S7: Comprehension and response tasks. The comprehension task (cause and effect) is as follows:

"告訴" (tell): Verb, no preceding subject, the information in the 0402 field of the "concept sub-class" of the database is 2920H, indicating that only speakers and listeners are required. The object category is also a person+event (i.e., a clause).

"我" (I): "我" is the object of the sentence, and the subject can be inferred as "你" (you). "告訴我" indicates that the user asks the comprehension system to provide a message. The subject of the first sentence can be omitted when the subject is only "你" or "我" Other subjects cannot be omitted unless they appear in the second sentence.

"澳門" (Macau): A name of a place. The sentence component is an attribute phrase, referring to the temperature of "澳門", placing "澳門" in the BSSLOCAS buffer.

"明後天" (tomorrow and the day after tomorrow): The time word. The sentence component is also an attributive phrase, referring to the temperature of "明天" (tomorrow) and "後天" (the day after tomorrow). Put the time in BSSTIMES.

"的": Auxiliary words indicating that the preceding words "澳門" and "明後天" are attributive phrases.

"氣溫" (temperature): The direct object of "告訴" is the subject-predicate phrase, "氣溫" is its subject, and there is time and place before it. Therefore, the function is set to check the weather. "澳門" and "明後天" have set up the BSSLOCAS and BSSTIMES buffer. Here, AH=2 queries weather and DL=2 queries temperature, and send these four parameters to the weather website for query. All weather query parameters are as follows:

Ah=2 weather

AL

DH is temporarily of no use, where DX=group+field, =00 webpage.

DL 00=all, of which 01=sunny or cloudy, 02=high temperature, 03=low temperature, 04=high humidity, 05=low humidity, 06=wind direction, 07=wind power, 08=UV, 09=typhoon, 0A=hurricane, 0B=thunderstorm, 0C=, 0D=, 0E=haze, 0F=tsunami, 10=earthquake, 11=sunrise, 12=sunset, 13=hail, 14=air pressure, 15=visibility, 16=air quality.

DL=1 (sunny or cloudy), where BL is as follows:

01=sunny, 02=cloud, 03=cloudy, 04=rain, 05=snow, 06=fog, 07=frost, 08=thunder;

01=sunny, BH has 01=sunny, 02=becoming sunny, 03=huge, 04=outing, 05=sunny day;

02=cloud, BH has 01=cloudy, 02=thick, 03=thin, 04=multi;

04=rain, BH has 01=rain, 02=light rain, 03=moderate rain, 04=rainstorm, 05=shower, 06=strong shower, 07=storm, 08=heavy storm, 09=extra heavy rain, 0A=thunderstorm, 0B=thunder shower, 0C=sleet, 0D=freezing rain, 10=huge, 11=small, 12=rain stopped;

05=snow, BH has 01=snow, 02=little snow, 03=moderate snow, 04=heavy snow, 05=blizzard, 06=snow shower, 12=snow stopped;

06=fog, BH has 01=fog, 02=dense fog, 03=dispersed fog;

08=thunder, BH has 01=thunder, 02=huge.

DL=2 (temperature): BL is 01=temperature, 02=highest/heat.

DL=3 (temperature): BL is 00=lowest/cold.

DL=4 (humidity): BL is 01=humidity, 02=highest/wet/huge.

DL=5 (humidity): BL is 00=lowest/dry.

DL=6 (wind direction): BL is 00=not specified, 01=east wind, 02=southeastern wind, 03=northeastern wind, 04=south wind, 05=north wind, 06=west wind, 07=southwest wind, 08=northwest wind, 09=no continuous wind direction, 0A=rotating wind.

DL=7 (wind power): BL is 00=not specified, 01=wind, 02=soft, 03=light, 04=micro, 05=clam, 06=clear, 07=strong, 08=disorder, 09=huge, 0A=strong, 0B=storm, 0C=mad, 0D=gust; BL is 00=wind power, 01=presence, non-presence, 02=direct question of the level of wind power.

DL=9 (typhoon): BL is 01=yes, 02=landing, 03=windball, 04=directly asking the windball, 05=color, 06=blue, 07=yellow, 08=orange, 09=red, 10=sea, 11=land (Taiwan); AL is 00=announce, 01=lifted/cancel.

DL=E (smoke): BL is 01=smoke, 02=floating dust, 03=rising sands, 04=sandstorm, 05=strong sandstorm.

"如何" (how): Adverb, asking for status.

Third Embodiment

Step S1: Entering the string "鸚鵡會飛嗎" (Will the parrot fly).

Therefore, the Unicode codes of this string are as follows:

| 鸚 | 鵡 | 會 | 飛 | 嗎 |
|---|---|---|---|---|
| 1A9E | 619D | 0367 | DB98 | CE55 |
| ? | | | | |
| 1FFF | | | | |

The read codes of this string converted into Cangjie codes are as follows:

| 鸚 | 鵡 | 會 | 飛 | 嗎 |
|---|---|---|---|---|
| 88BB91D0 | B68C91D0 | BEF38280 | B9F49E80 | CAB8CC80 |
| ? | | | | |
| 8080A0BF | | | | |

Step S2: The read codes of Cangjie codes are converted into digital codes, and the string is converted into digital codes as follows:

| 鸚 | 鵡 | 會 | 飛 | 嗎 |
|---|---|---|---|---|
| 59040000 | 59040100 | 0A000001 | A0040501 | 0D030000 |
| ? | | | | |
| 130F0102 | | | | |

Step S3: Polysemy processing. Because the history of the language is long and the use thereof is flexible, a word is often derived from a certain attribute, and hence the case of polysemy.

In an embodiment, the concept of the Chinese character "會" is more than ten. However, when "會"+the concept code>digital code 80 (that is, a verb), it is taken as an auxiliary verb, that is, the auxiliary verb+verb. Therefore, the digital code of the first concept is selected.

"飛" (fly): Only birds, insects, and aircraft can "fly", and the rest refer to the meaning of fast or floating. There is a bird preceding this Chinese character (digital code 59), so the digital code AA020020 of the second concept of "飛" is taken.

Step S4: Word formation processing. The first character of the digital codes of "鸚" and "鵡" are both 59, which can be combined into one phrase.

Step S5: Name processing, confirming no name.

Step S6: sentence processing. As shown in the following table:

| Original term | Analysis | Part of speech and sentence components |
|---|---|---|
| 鸚鵡 | Digital codes 59?? | Noun (bird, subject) |
| 會 | Digital codes 0A00 | Auxiliary verb (adverbial) |
| 飛 | Digital codes AA02 | Verb |
| ? | Digital codes 130F | Punctuation, indicating end of the sentence |

Step S7: Comprehension and response. Comprehension as follows:

鸚鵡 (Parrot): Subject, the first character of the digital code "59" refers to a bird.

會: Auxiliary verb, indicating ability.

飛: Verb, the data in the field 0402 of the "concept sub-class" of the database is 4000H. However, when asked the ability, this parameter can be ignored. When asked when the flight will take off or the destination, additional parameters such as start time or destination will be added.

嗎: Questionable auxiliary.

?: This sentence ends with a question mark.

In an embodiment, if the subject is questioned whether it can fly or not, the subject which can fly includes: the first type is the radical 反 of Cangjie codes "竹日火" such as 鸚, 鵡, 鵰, 鷳, etc.; or the digital code 5D of the second type (flying insect), 6D0C (aircraft), etc. Therefore, 鸚鵡 (parrot) belongs to the first type, so the subsequent response system 2 (as shown in FIG. 7) will respond "會飛" (can fly).

Figure 7:
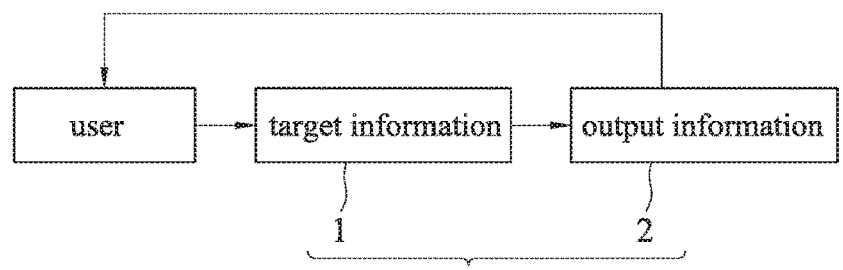
FIG. 7 is a schematic diagram showing the application of the Chinese common sense comprehension system according to the present disclosure.

Therefore, if the Chinese common sense comprehension system according to the present disclosure is applied to the artificial intelligence device 6 (such as a fixed device of a desktop computer, a smart phone or a mobile device of a robot), as shown in FIG. 7, when the user and the artificial intelligence device 6 communicates in Chinese, the artificial intelligence device 6 converts the Chinese character into target information by the Chinese common sense comprehension system 1 for the response system 2 of the artificial intelligence device 6 to respond according to the target information (i.e., output information).

In summary, the Chinese common sense comprehension system and the method for comprehending Chinese common sense according to the present disclosure pair Chinese characters (Cangjie codes) into hexadecimal digital codes by defining 255 concept options, and then convert the digital codes into codes for the integration module to analyze and select the correct codes as the target information. Therefore, the Chinese common sense comprehension system according to the present disclosure adopts the logic mode of human in learning Chinese, thereby improving the accuracy of the artificial intelligence device to comprehend Chinese.

The above embodiments are intended to illustrate the principles of the disclosure and its effects, and are not intended to limit the present disclosure. Any person skilled in the art can modify the above embodiments without departing from the spirit and scope of the disclosure. Therefore, the scope of protection of the present disclosure should be the scope of the claims described in the following section.

What is claimed is:

1. A Chinese common sense comprehension system device, comprising:
   a simulation module configured to simulate Cangjie codes into concept information, wherein the concept information includes at least one digital code containing at least one character presented in hexadecimal format; and
   an integration module communicating with the simulation module and configured to integrate the concept information into target information, wherein the target information includes at least one program code;
   wherein the integration module has a conversion unit configured for converting the digital code into the program code for use as temporary information;
   wherein the integration module has an analysis unit configured for analyzing the temporary information and determining whether the program code is correct, and the program code determined is configured to perform comprehension tasks and is used as the target information.

2. The Chinese common sense comprehension system according to claim 1, wherein the simulation module simulates the Cangjie codes into the digital code by a concept classification method, wherein the concept classification method is a method for classifying Chinese characters and Chinese words according to different attributes.

3. The Chinese common sense comprehension system according to claim 1, wherein the simulation module simulates the Cangjie codes into the digital code by a natural meaning method, wherein the natural meaning method is an analysis method for deriving a literal meaning according to a natural meaning of a Chinese character.

4. The Chinese common sense comprehension system according to claim 1, wherein the digital code is converted into the program code by a carry conversion method.

5. The Chinese common sense comprehension system according to claim 4, wherein the carry conversion method is a conversion between any two of a binary system, an octal system, a decimal system and a hexadecimal system.

6. The Chinese common sense comprehension system according to claim 1, wherein the analysis unit is configured to analyze the temporary information by defining information to determine whether the program code is correct, and wherein the analysis unit includes at least one of a word analysis algorithm, a sentence analysis algorithm, a polysemous algorithm, and a semantic comprehension algorithm.

7. The Chinese common sense comprehension system according to claim 1, further comprising an identification module configured to disassemble input information into the Cangjie codes, wherein the input information includes at least one Chinese character.

8. The Chinese common sense comprehension system according to claim 7, wherein the target information corresponds to the input information.

9. The Chinese common sense comprehension system according to claim 1, further comprising a reference module including at least one reference information, wherein the integration module is configured to compare the reference information with the at least one digital code and obtain the program code required as the target information after comparison.

10. The Chinese common sense comprehension system according to claim 9, wherein the reference information is a basic concept database, an application concept library, or a personal database.

11. An artificial intelligence device, comprising:
    the Chinese common sense comprehension system according to claim 1; and
    a response system configured to generate output information based on the target information.

12. The artificial intelligence device according to claim 11 being a fixed device or a mobile device.

13. A method for comprehending Chinese common sense, comprising:
    simulating, by a simulation module, Cangjie codes into concept information, wherein the concept information includes at least one digital code containing at least one character presented in hexadecimal format; and
    integrating, by an integration module, the concept information into target information, wherein the target information includes at least one program code;
    converting the digital code into the program code for use as temporary information;
    analyzing the temporary information and determining whether the program code is correct, and the program code determined performs comprehension tasks and is used as the target information.

14. The method according to claim 13, wherein the Cangjie codes are simulated into the digital code by a concept classification method, and wherein the concept classification method is a method for classifying Chinese characters and Chinese words according to different attributes.

15. The method according to claim 13, wherein the Cangjie codes are simulated to the digital code by a natural meaning method, and wherein the natural meaning method is an analysis method for deriving a literal meaning according to a natural meaning of a Chinese character.

16. The method according to claim 13, wherein the digital code is converted into the program code by a carry conversion method.

17. The method according to claim 16, wherein the carry conversion method is a conversion between any two of a binary system, an octal system, a decimal system and a hexadecimal system.

18. The method according to claim 13, wherein the temporary information is analyzed by defining information to determine whether the program code is correct, and wherein the information is defined by an analysis method including at least one of a word analysis algorithm, a sentence analysis algorithm, a polysemous algorithm, and a semantic comprehension algorithm.

19. The method according to claim 13, further comprising disassembling input information into the Cangjie codes, wherein the input information includes at least one Chinese character.

20. The method according to claim 19, wherein the target information corresponds to the input information.

21. The method according to claim 13, further comprising comparing the at least one digital code with the reference information, wherein the integration module obtains the program code required as the target information after comparison.

22. The method according to claim 21, wherein the reference information is a basic concept database, an application concept library, or a personal database.

* * * * *